US012718814B2

(12) United States Patent
Hasegawa et al.

(10) Patent No.: US 12,718,814 B2
(45) Date of Patent: Aug. 25, 2026

(54) ACTION CONTROL DEVICE WITH HUMAN VOICE DETECTOR, AND ACTION CONTROL METHOD AND RECORDING MEDIUM

(71) Applicant: CASIO COMPUTER CO., LTD., Tokyo (JP)

(72) Inventors: Hirokazu Hasegawa, Tokyo (JP); Erina Ichikawa, Tokyo (JP); Kayoko Onoda, Tokyo (JP); Kouki Mayuzumi, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 230 days.

(21) Appl. No.: 18/538,310

(22) Filed: Dec. 13, 2023

(65) Prior Publication Data

US 2024/0231373 A1 Jul. 11, 2024

(30) Foreign Application Priority Data

Jan. 5, 2023 (JP) ................................ 2023-000364

(51) Int. Cl.

| | |
|---|---|
| ***G10L 15/22*** | (2006.01) |
| ***G05D 1/243*** | (2024.01) |
| ***H04R 1/32*** | (2006.01) |
| *G05D 111/20* | (2024.01) |

(52) U.S. Cl.

CPC .............. *G10L 15/22* (2013.01); *G05D 1/243* (2024.01); *H04R 1/326* (2013.01); *G05D 2111/20* (2024.01); *G10L 2015/223* (2013.01)

(58) Field of Classification Search

None

See application file for complete search history.

(56) References Cited

U.S. PATENT DOCUMENTS

| | | | | |
|---|---|---|---|---|
| 10,667,045 | B1 * | 5/2020 | Xiong | H04R 1/406 |
| 2004/0054531 | A1 * | 3/2004 | Asano | G10L 15/20 704/231 |
| 2020/0020328 | A1 * | 1/2020 | Gordon | G10L 15/08 |
| 2020/0269436 | A1 | 8/2020 | Sasagawa et al. | |
| 2021/0370505 | A1 * | 12/2021 | Rubæk | B25J 13/086 |

FOREIGN PATENT DOCUMENTS

| | | | |
|---|---|---|---|
| JP | 2003195886 | A | 7/2003 |
| JP | 2010169861 | A | 8/2010 |
| JP | 6575637 | B2 | 8/2019 |
| JP | 2019166272 | A | 10/2019 |
| JP | 2019217122 | A | 12/2019 |
| JP | 2020137549 | A | 9/2020 |

* cited by examiner

*Primary Examiner* — Antim G Shah

(74) *Attorney, Agent, or Firm* — Holtz, Holtz & Volek PC

(57) ABSTRACT

An action control device includes a sound acquirer, an actuator, and a controller. In response to the controller determining, during an action of the actuator, that a sound acquired by the sound acquirer is a human voice, the controller controls so as to stop the actuator, capture sound after the determination for a predetermined period, and in response to the predetermined period having elapsed, restart the action of the actuator.

9 Claims, 10 Drawing Sheets

| CONTROL CONDITION | CONTROL DATA |
|---|---|
| BODY IS PETTED | MOTION DATA<br>0:0:0<br>500:60:0<br>1000:60:60<br>1500:60:-60<br>2000:60:60<br>2500:60:-60<br><br>SOUND EFFECT DATA<br>PLEASED SOUND |
| HEARD A LOUD SOUND | MOTION DATA<br>0:0:0<br>100:60:0 |
| SPOKEN TO | SOUND EFFECT DATA<br>CHEERFUL SOUND |
| BREATHING CYCLE ELAPSED | MOTION DATA<br>0:0:0<br>1000:10:0<br>2000:0:0<br>3000:10:0<br>4000:0:0<br>5000:10:0<br>6000:0:0 |
| ⋮ | ⋮ |

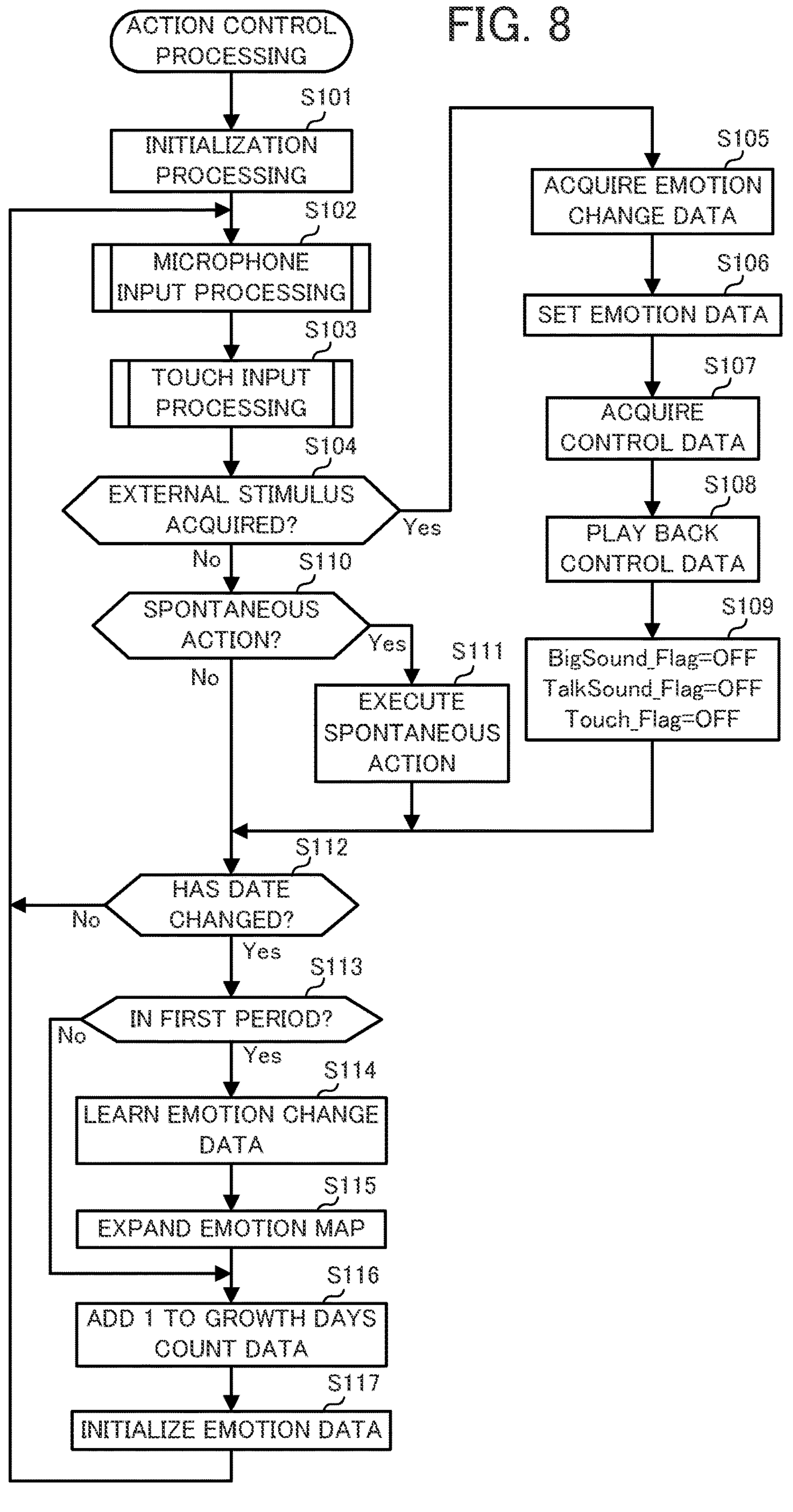
FIG. 8
ACTION CONTROL PROCESSING
S101
INITIALIZATION PROCESSING
S102
MICROPHONE INPUT PROCESSING
S103
TOUCH INPUT PROCESSING
S104
EXTERNAL STIMULUS ACQUIRED?
Yes
No
S105
ACQUIRE EMOTION CHANGE DATA
S106
SET EMOTION DATA
S107
ACQUIRE CONTROL DATA
S108
PLAY BACK CONTROL DATA
S109
BigSound_Flag=OFF
TalkSound_Flag=OFF
Touch_Flag=OFF
S110
SPONTANEOUS ACTION?
Yes
No
S111
EXECUTE SPONTANEOUS ACTION
S112
HAS DATE CHANGED?
No
Yes
S113
IN FIRST PERIOD?
No
Yes
S114
LEARN EMOTION CHANGE DATA
S115
EXPAND EMOTION MAP
S116
ADD 1 TO GROWTH DAYS COUNT DATA
S117
INITIALIZE EMOTION DATA

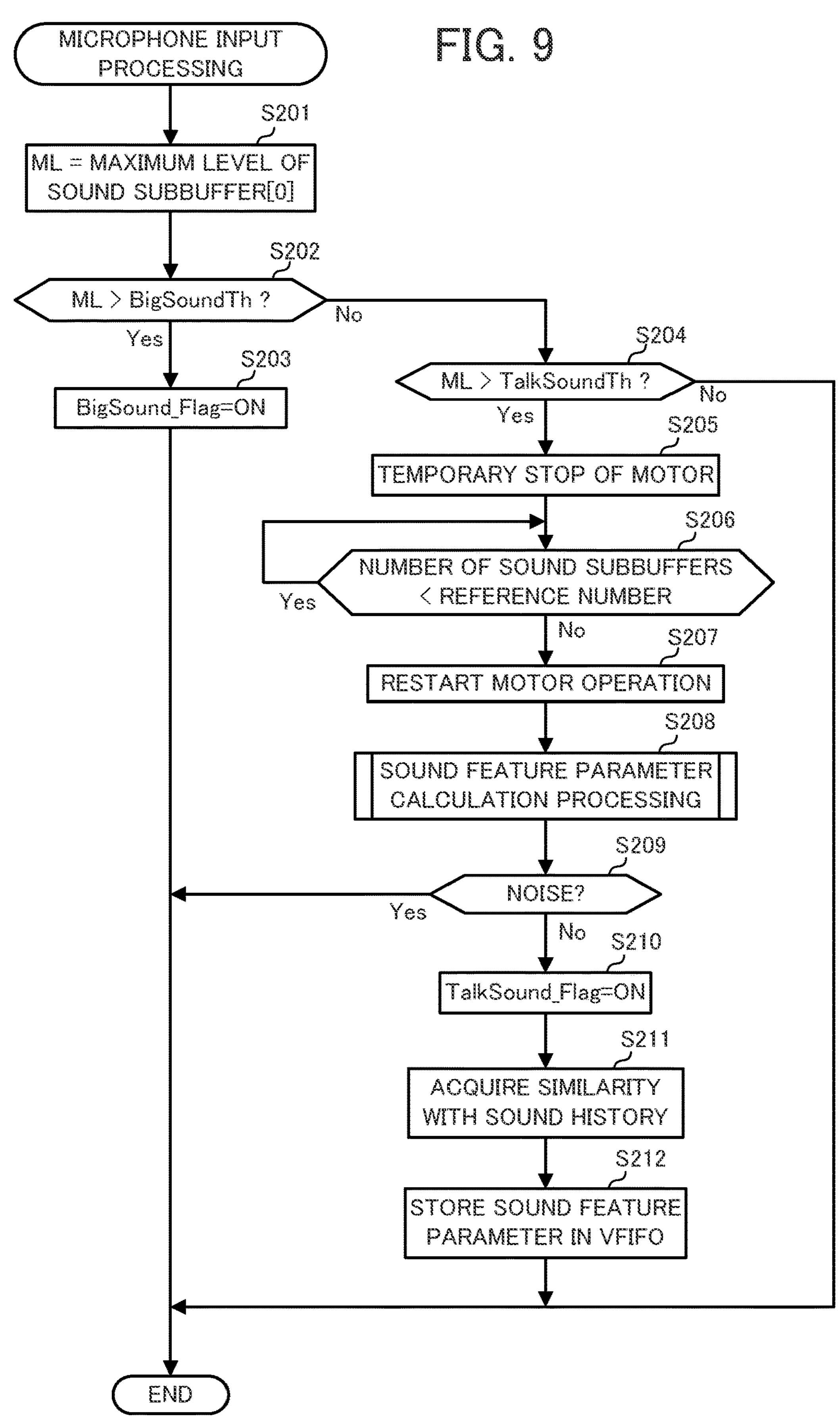
FIG. 9
MICROPHONE INPUT PROCESSING
S201
ML = MAXIMUM LEVEL OF SOUND SUBBUFFER[0]
S202
ML > BigSoundTh ?
Yes
No
S203
BigSound_Flag=ON
S204
ML > TalkSoundTh ?
Yes
No
S205
TEMPORARY STOP OF MOTOR
S206
NUMBER OF SOUND SUBBUFFERS < REFERENCE NUMBER
Yes
No
S207
RESTART MOTOR OPERATION
S208
SOUND FEATURE PARAMETER CALCULATION PROCESSING
S209
NOISE?
Yes
No
S210
TalkSound_Flag=ON
S211
ACQUIRE SIMILARITY WITH SOUND HISTORY
S212
STORE SOUND FEATURE PARAMETER IN VFIFO
END

ACTION CONTROL DEVICE WITH HUMAN VOICE DETECTOR, AND ACTION CONTROL METHOD AND RECORDING MEDIUM

CROSS-REFERENCE TO RELATED APPLICATIONS

This application claims the benefit of Japanese Patent Application No. 2023-000364, filed on Jan. 5, 2023, the entire disclosure of which is incorporated by reference herein.

FIELD OF THE INVENTION

The present disclosure relates generally to an action control device, an action control method, and a recording medium.

BACKGROUND OF THE INVENTION

Various types of pet robots have been developed in the related technology. Pet robots frequently include a microphone for recognizing sound emitted by a user, and actuators for moving a head, legs, and the like. However, the noise emitted when the actuators operate may become an obstacle to the recognition of the sound. As such, Unexamined Japanese Patent Application Publication No. 2003-195886, for example, describes a robot that includes a microphone on a head and, also, in which it is possible to reduce the effects, on the microphone, of the noise emitted by the actuators.

SUMMARY OF THE INVENTION

One aspect of an action control device according the present disclosure that achieves the objective described above includes:

- a sound acquirer, an actuator, and a controller, wherein in response to the controller determining, during an action of the actuator, that a sound acquired by the sound acquirer is a human voice, the controller controls so as to stop the actuator, capture sound after the determination for a predetermined period, and in response to the predetermined period having elapsed, restart the action of the actuator.

BRIEF DESCRIPTION OF DRAWINGS

A more complete understanding of this application can be obtained when the following detailed description is considered in conjunction with the following drawings, in which:

FIG. 7 is a drawing explaining an example of a control content table according to Embodiment 1;

FIG. 8 is a flowchart of action control processing according to Embodiment 1;

FIG. 9 is a flowchart of microphone input processing according to Embodiment 1;

DETAILED DESCRIPTION OF THE INVENTION

Figure 1:
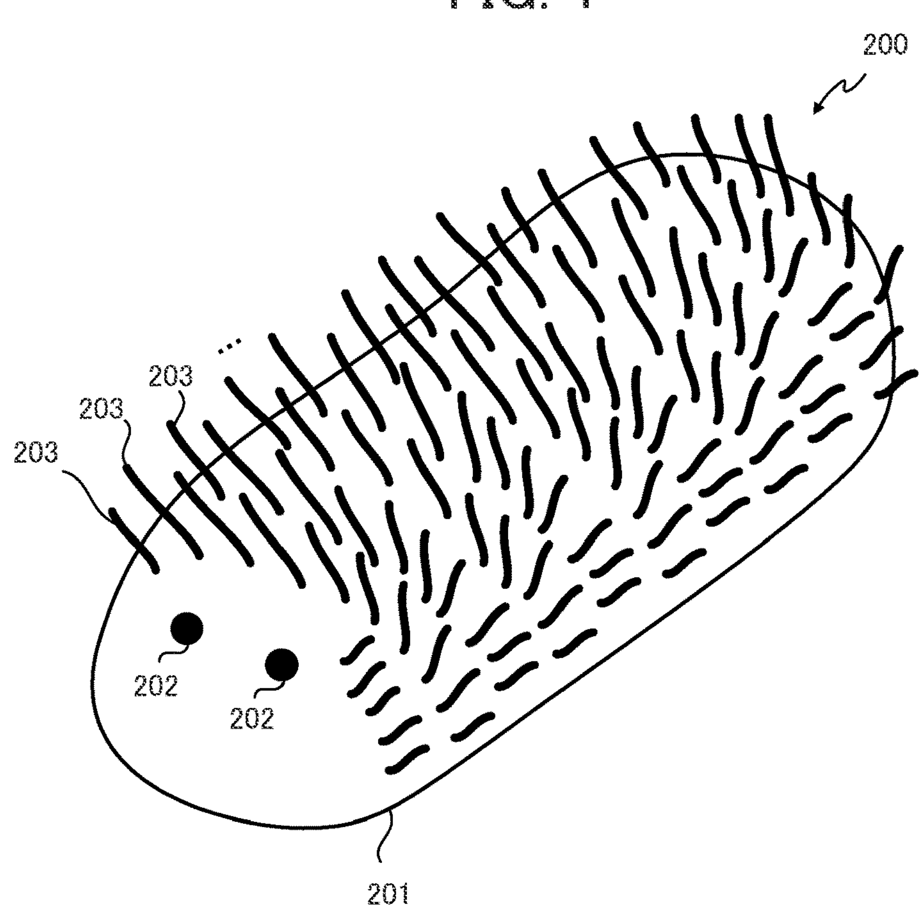
FIG. 1 is a drawing illustrating the appearance of a robot according to Embodiment 1.

Hereinafter, embodiments of the present disclosure are described while referencing the drawings. Note that, in the drawings, identical or equivalent components are denoted by the same reference numerals.

Embodiment 1

Figure 2:
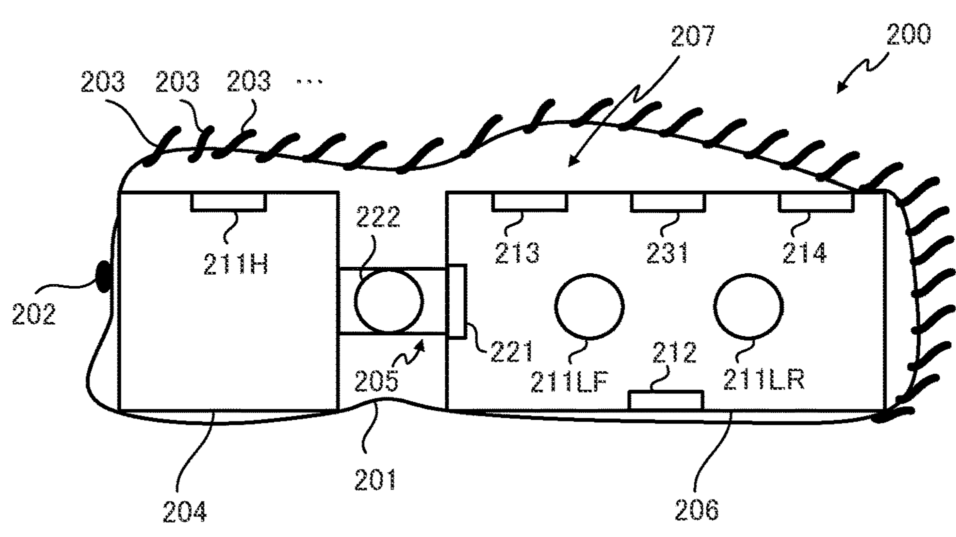
FIG. 2 is a cross-sectional view of the robot according to Embodiment 1, viewed from a side surface.

An embodiment in which an action control device according to Embodiment 1 is applied to a robot 200 illustrated in FIG. 1 is described while referencing the drawings. As illustrated in FIG. 1, the robot 200 according to the embodiment is a pet robot that resembles a small animal. The robot 200 is covered with an exterior 201 provided with bushy fur 203 and decorative parts 202 resembling eyes. A housing 207 of the robot 200 is accommodated in the exterior 201. As illustrated in FIG. 2, the housing 207 of the robot 200 includes a head 204, a coupler 205, and a torso 206. The head 204 and the torso 206 are coupled by the coupler 205.

Regarding the torso 206, as illustrated in FIG. 2, a servo motor called a twist motor 221 is provided at a front end of the torso 206, and the head 204 is coupled to the front end of the torso 206 via the coupler 205. Moreover, the coupler 205 is provided with servo motor called a vertical motor 222. Note that, in FIG. 2, the twist motor 221 is provided on the torso 206, but may be provided on the coupler 205 or on the head 204. Additionally, in FIG. 2, the vertical motor 222 is provided on the coupler 205, but may be provided on the torso 206 or on the head 204. In any case, the twist motor 221 and the vertical motor 222 are provided inside the housing 207.

The twist motor 221 can rotate the head 204 with respect to the torso 206 around a first rotational axis that passes through the coupler 205 and extends in the front-back direction of the torso 206. Additionally, the vertical motor 222 can rotate the head 204 upward and downward with respect to the torso 206 around a second rotational axis that passes through the coupler 205 and extends in the width direction of the torso 206.

Figure 3:
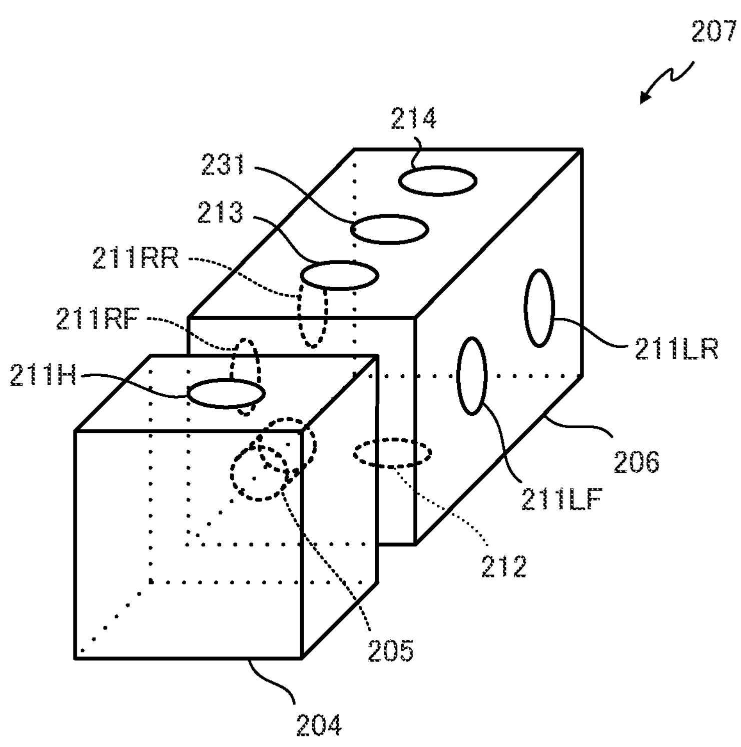
FIG. 3 is a drawing for explaining a housing of the robot according to Embodiment 1.

The robot 200 includes a touch sensor 211 that can detect petting or striking of the robot 200 by a user. More specifically, as illustrated in FIG. 2, the robot 200 includes a touch sensor 211H on the head 204. The touch sensor 211H can detect petting or striking of the head 204 by the user. Additionally, as illustrated in FIGS. 2 and 3, the robot 200 includes a touch sensor 211LF and a touch sensor 211LR respectively on the front and rear of a left-side surface of the torso 206, and a touch sensor 211RF and a touch sensor 211RR respectively on the front and rear of a right-side surface of the torso 206. These touch sensors 211LF, 211LR, 211RF, 211RR can detect petting or striking of the torso 206 by the user.

The robot 200 includes an acceleration sensor 212 on the torso 206. The acceleration sensor 212 can detect an attitude (orientation) of the robot 200, and can detect being picked up, the orientation being changed, being thrown, and the like by the user. The robot 200 includes a gyrosensor 213 on the torso 206. The gyrosensor 213 can detect vibrating, rolling, rotating, and the like of the robot 200.

The robot 200 includes a microphone 214 on the torso 206. The microphone 214 can detect external sounds. As illustrated in FIG. 2, the microphone 214 is provided at a position, of a surface of the housing 207, suitable for acquiring external environmental sounds. Additionally, the microphone 214 may be provided with directionality having sound collection characteristics that makes it less likely to pick up the sound of the servo motors (the twist motor 221 and the vertical motor 222).

Furthermore, the robot 200 includes a speaker 231 on the torso 206. The speaker 231 can be used to emit animal sounds, sing songs, and the like.

Note that, in the present embodiment, the acceleration sensor 212, the gyrosensor 213, the microphone 214, and the speaker 231 are provided on the torso 206, but a configuration is possible in which all or a portion of these components are provided on the head 204. Note that a configuration is possible in which, in addition to the acceleration sensor 212, the gyrosensor 213, the microphone 214, and the speaker 231 provided on the torso 206, all or a portion of these components are also provided on the head 204. The touch sensor 211 is provided on each of the head 204 and the torso 206, but a configuration is possible in which the touch sensor 211 is provided on only one of the head 204 and the torso 206. Moreover, a configuration is possible in which a plurality of any of these components is provided.

Figure 4:
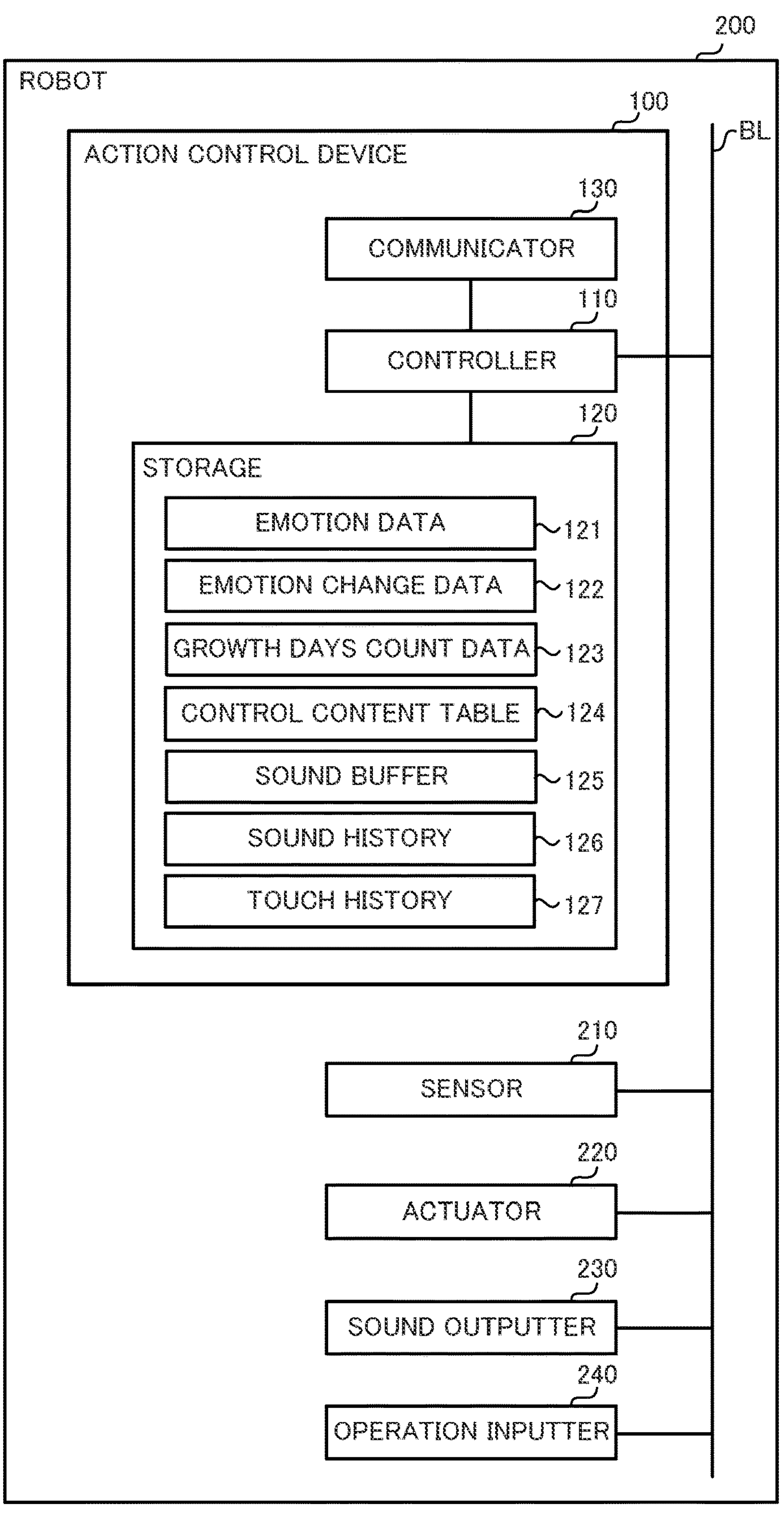
FIG. 4 is a block diagram illustrating the functional configuration of the robot according to Embodiment 1.

Next, the functional configuration of the robot 200 is described. As illustrated in FIG. 4, the robot 200 includes an action control device 100, a sensor 210, an actuator 220, a sound outputter 230, and an operation inputter 240. Moreover, the action control device 100 includes a controller 110, a storage 120, and a communicator 130. In FIG. 4, the action control device 100, and the sensor 210, the actuator 220, the sound outputter 230, and the operation inputter 240 are connected to each other via a bus line BL, but this is merely an example. A configuration is possible in which the action control device 100, and the sensor 210, the actuator 220, the sound outputter 230, and the operation inputter 240 are connected by a wired interface such as a universal serial bus (USB) cable or the like, or by a wireless interface such as Bluetooth (registered trademark) or the like. Additionally, a configuration is possible in which the controller 110, and the storage 120 and the communicator 130 are connected via the bus line BL.

The action control device 100 controls, by the controller 110 and the storage 120, actions of the robot 200. Note that the robot 200 is a device that is controlled by the action control device 100 and, as such, is also called a "controlled device."

In one example, the controller 110 is configured from a processor such as a central processing unit (CPU) or the like, and executes various processings described later using programs stored in the storage 120. Note that the controller 110 is compatible with multithreading functionality, in which a plurality of processings are executed in parallel. As such, the controller 110 can execute the various processings described below in parallel. Additionally, the controller 110 is provided with a clock function and a timer function, and can measure the date and time, and the like.

The storage 120 is configured from read-only memory (ROM), flash memory, random access memory (RAM), or the like. Programs to be executed by the CPU of the controller 110, and data needed in advance to execute these programs are stored in the ROM. The flash memory is writable non-volatile memory, and stores data that is desired to be retained even after the power is turned OFF. Data that is created or modified during the execution of the programs is stored in the RAM. In one example, the storage 120 stores emotion data 121, emotion change data 122, growth days count data 123, a control content table 124, a sound buffer 125, a sound history 126, a touch history 127, and the like, all described hereinafter.

The communicator 130 includes a communication module compatible with a wireless local area network (LAN), Bluetooth (registered trademark), or the like, and carries out data communication with a smartphone or similar external device.

The sensor 210 includes the touch sensor 211, the acceleration sensor 212, the gyrosensor 213, and the microphone 214 described above. The controller 110 acquires, as external stimulus data, detection values detected by the various sensors of the sensor 210. The external stimulus data expresses an external stimulus acting on the robot 200. Note that a configuration is possible in which the sensor 210 includes sensors other than the touch sensor 211, the acceleration sensor 212, the gyrosensor 213, and the microphone 214. The types of external stimuli acquirable by the controller 110 can be increased by increasing the types of sensors of the sensor 210. For example, the sensor 210 may include an image acquirer such as a charge-coupled device (CCD) image sensor, or the like. In this case, the controller 110 recognizes an image acquired by the image acquirer and, as a result, can determine who a person nearby is (for example, an owner, a person that always cares for the robot 200, a stranger, or the like), and the like.

The touch sensor 211 detects contacting by some sort of object. The touch sensor 211 is configured from a pressure sensor or a capacitance sensor, for example. The controller 110 acquires a contact strength and/or a contact time on the basis of the detection values from the touch sensor 211 and, on the basis of these values, can detect an external stimulus such as that the robot 200 is being pet or being struck by the user, and the like (for example, see Unexamined Japanese Patent Application Publication No. 2019-217122). Note that a configuration is possible in which the controller 110 detects these external stimuli by a sensor other than the touch sensor 211 (for example, see Japanese Patent No. 6575637).

The acceleration sensor 212 detects acceleration in three axial directions, namely the front-back direction (X-axis direction), the width (left-right) direction (Y-axis direction), and the vertical direction (Z direction) of the torso 206 of the robot 200. The acceleration sensor 212 detects gravitational acceleration when the robot 200 is stopped and, as such, the controller 110 can detect a current attitude of the robot 200 on the basis of the gravitational acceleration detected by the acceleration sensor 212. Additionally, when, for example, the user picks up or throws the robot 200, the acceleration sensor 212 detects, in addition to the gravitational acceleration, acceleration caused by the movement of the robot 200. Accordingly, the controller 110 can detect the movement of the robot 200 by removing the gravitational acceleration component from the detection value detected by the acceleration sensor 212.

The gyrosensor 213 detects angular velocity of the three axes of the robot 200. The controller 110 can determine a rotation state of the robot 200 on the basis of the angular velocities of the three axes. Additionally, the controller 110 can determine a vibration state of the robot 200 on the basis of the maximum values of the angular velocities of the three axes.

In the present embodiment, in touch input processing described later, the controller 110 determines, on the basis of the gravitational acceleration detected by the acceleration sensor 212, if the current attitude of the robot 200 is horizontal, upside down, upward facing, downward facing, or sideways facing (left sideways facing or right sideways facing). Then, in accordance with a determination result, one value of numerical values 0 to 4 (0 for horizontal, 1 for upside down, 2 for upward facing. 3 for downward facing, and 4 for sideways facing) is stored in the storage 120 as a value of a variable dir.

Additionally, in the touch input processing described later, the controller 110 acquires each of a touch strength of the head on the basis of a detection value of a touch sensor 211H, a touch strength of a left side surface on the basis of detection values of the touch sensor 211LF and a touch sensor 211LR, a touch strength of a right side surface on the basis of detection values of a touch sensor 211RF and a touch sensor 211RR, and a vibration strength on the basis of a detection value of the gyrosensor 213. Moreover, the controller 110 stores, in the storage 120, the acquired strengths respectively as a variable touch_Head (touch strength of head), a variable touch_Left (touch strength of left side surface), a variable touch_Right (touch strength of right side surface), and a variable gyro_Level (vibration strength).

In the touch input processing, the controller 110 integrates the various detection values acquired as described above and treats the integrated detection values as a touch feature parameter. That is, the touch feature parameter includes five-dimensional information of the attitude of the robot 200 (dir), the touch strength of the head (touch_Head), the touch strength of the left side surface (touch_Left), the touch strength of the right side surface (touch_Right), and the vibration strength (gyro_Level).

Then, a history storage number (256 in the present embodiment) of the touch feature parameter is stored in the storage 120 in a first-in first-out (FIFO) method. In the present embodiment, the FIFO storing the touch feature parameter is called "TFIFO", and the number of touch feature parameters stored in the TFIFO is stored in a variable called "TFIFO_SIZE." Specifically, TFIFO_SIZE has an initial value of 0, and is increased by 1 each time a new touch feature parameter is stored. After being increased to the history storage number, the TFIFO_SIZE becomes constant at the history storage number, and the oldest touch feature parameter is deleted from the TFIFO every time a new touch feature parameter is stored in the TFIFO. A history of the touch feature parameter is stored in the TFIFO and, as such, the TFIFO is also called a "touch history."

Returning to FIG. 4, the microphone 214 is a sound acquirer that detects ambient sound of the robot 200. The controller 110 can analyze the sound detected by the microphone 214 to detect that, for example, the user is speaking to the robot 200, the user is clapping their hands, and the like.

Figure 5:
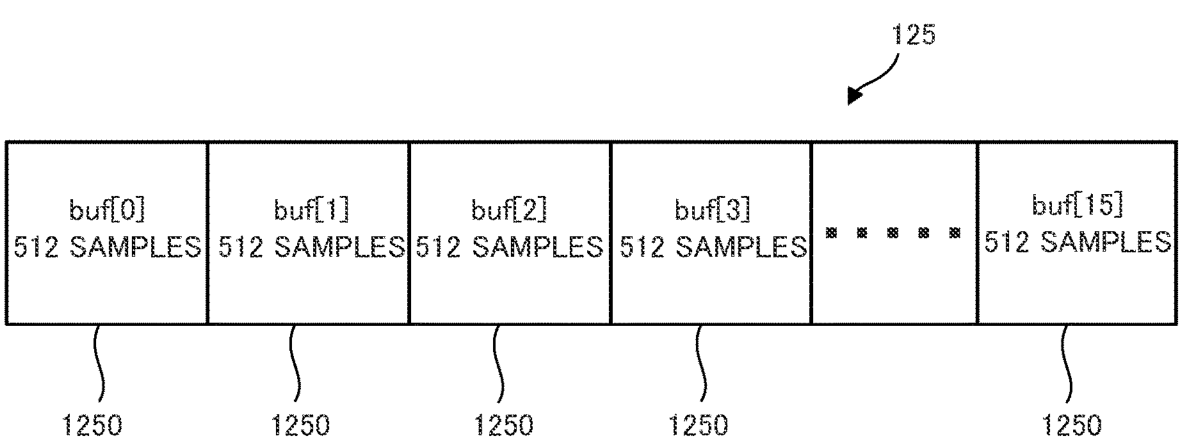
FIG. 5 is a drawing illustrating an example of a sound buffer according to Embodiment 1.

Specifically, the controller 110 samples, at a prescribed sampling frequency (16,384 Hz in the present embodiment) and number of quantization bits (16 bits in the present embodiment), sound data acquired from the microphone 214, and stores the sampled sound data in the sound buffer 125 of the storage 120. In the present embodiment, the sound buffer 125 (storage region of sound data) has a configuration in which a reference number (in the present embodiment, 16) of sound subbuffers are consecutively provided. The reference number corresponds to the minimum amount of data required for each of the sound subbuffers, in which 512 samples of sampling data are included, to analyze the sound data acquired by the microphone 214, and determine whether that sound data is a talking voice and also, if that talking voice is similar to a sound acquired in the past. Specifically, as illustrated in FIG. 5, similarity with the sound stored in the sound history is determined with 16 consecutive sound subbuffers 1250 as one unit.

In the present embodiment, the 16 consecutive sound subbuffers 1250 are expressed as array variables. For example, a first (1st) sound subbuffer 1250 is expressed as buf[0] and a final (16th) sound subbuffer 1250 is expressed as buf[15]. 512 samples×16 buffers/16384 Hz=0.5 seconds of sound data is stored by the sound buffer 125 constituted from the 16 sound subbuffers 1250. Moreover, this period of 0.5 seconds corresponds to the amount of the sample data required for the controller 110 to analyze the sound data acquired from the microphone 214 and determine that the sound acquired from the microphone 214 is a human voice.

Note that, in the present embodiment, processing in which the controller 110 stores the sound data acquired from the microphone 214 in the sound buffer 125 is executed in parallel with other processings as a sound buffer storage thread (execution of the sound buffer storage thread starts when the user turns ON the power of the robot 200). In the sound buffer storage thread, the controller 110 subjects the sound data acquired from the microphone 214 to a (for example, a digital signal processor (DSP)-based) low pass filter to remove noise, and then samples the sound data at the prescribed sampling frequency and number of quantization bits and stores the sampled sound data in the sound buffer 125.

Additionally, in the present embodiment, in sound feature parameter calculation processing described later, the controller 110 performs, for each of the 16 sound subbuffers 1250, processing for calculating three pieces of cepstrum information from the 512 samples of sampling data in one of the sound subbuffers 1250. The controller 110 treats the 48 (=3×16) pieces of data obtained thereby as a 48-dimension sound feature parameter.

A history storage number (for example, 256) of this sound feature parameter is stored in the storage 120 in a first-in first-out (FIFO) method. In the present embodiment, the FIFO storing the sound feature parameter is called "VFIFO", and the number of sound feature parameters stored in the VFIFO is stored in a variable called "VFIFO_SIZE." A history of the sound feature parameter is stored in the VFIFO and, as such, the VFIFO is also called "sound history."

Returning to FIG. 4, the actuator 220 includes the twist motor 221 and the vertical motor 222, and is driven by the controller 110. The controller 110 controls the actuator 220 and, as a result, the robot 200 can express actions such as, for example, lifting the head 204 up (rotating upward around the second rotational axis), twisting the head 204 sideways (twisting/rotating to the right or to the left around the first rotational axis), and the like. Control data (motion data) for performing these actions are stored in the storage 120, and the actions of the robot 200 are controlled on the basis of the detected external stimulus, the emotion data 121 and similarity described later, and the like.

Note that the description given above is an example of the actuator 220. The actuator 220 may be a movement means such as a wheel, a crawler, or the like. Additionally, the robot 200 may include parts such as arms, legs, a tail, or the like, and the actuator 220 may be configured to move these parts (arms, legs, tail, or the like). Due to the actions of the actuator 220, positional relationships between the parts such as the head 204, the arms, the legs, and the tail and the torso 206 of the housing 207 change.

The sound outputter 230 includes the speaker 231, and sound is output from the speaker 231 as a result of sound data being input into the sound outputter 230 by the controller 110. For example, the robot 200 emits a pseudo-animal sound as a result of the controller 110 inputting animal sound data of the robot 200 into the sound outputter 230. This animal sound data is also stored in the storage 120 as control data (sound effect data), and an animal sound is selected on the basis of the detected external stimulus, the emotion data 121 and the similarity described later, and the like.

In one example, the operation inputter 240 is configured from an operation button, a volume knob, or the like. The operation inputter 240 is an interface for receiving operations performed by the user (owner or borrower) such as, for example, turning the power ON/OFF, adjusting the volume of the output sound, and the like. Note that a configuration is possible in which, in order to further enhance a sense of lifelikeness, the robot 200 includes only a power switch as the operation inputter 240 on the inside of the exterior 201, and does not include other operation buttons, the volume knob, and the like. In such a case as well, operations such as adjusting the volume of the robot 200 can be performed using an external smartphone or the like connected via the communicator 130.

The functional configuration of the robot 200 is described above. Next, the data stored in the storage 120, namely the emotion data 121, the emotion change data 122, the growth days count data 123, a control content table 124, the sound buffer 125, the sound history 126, the touch history 127, and the like are described in order.

Figure 6:
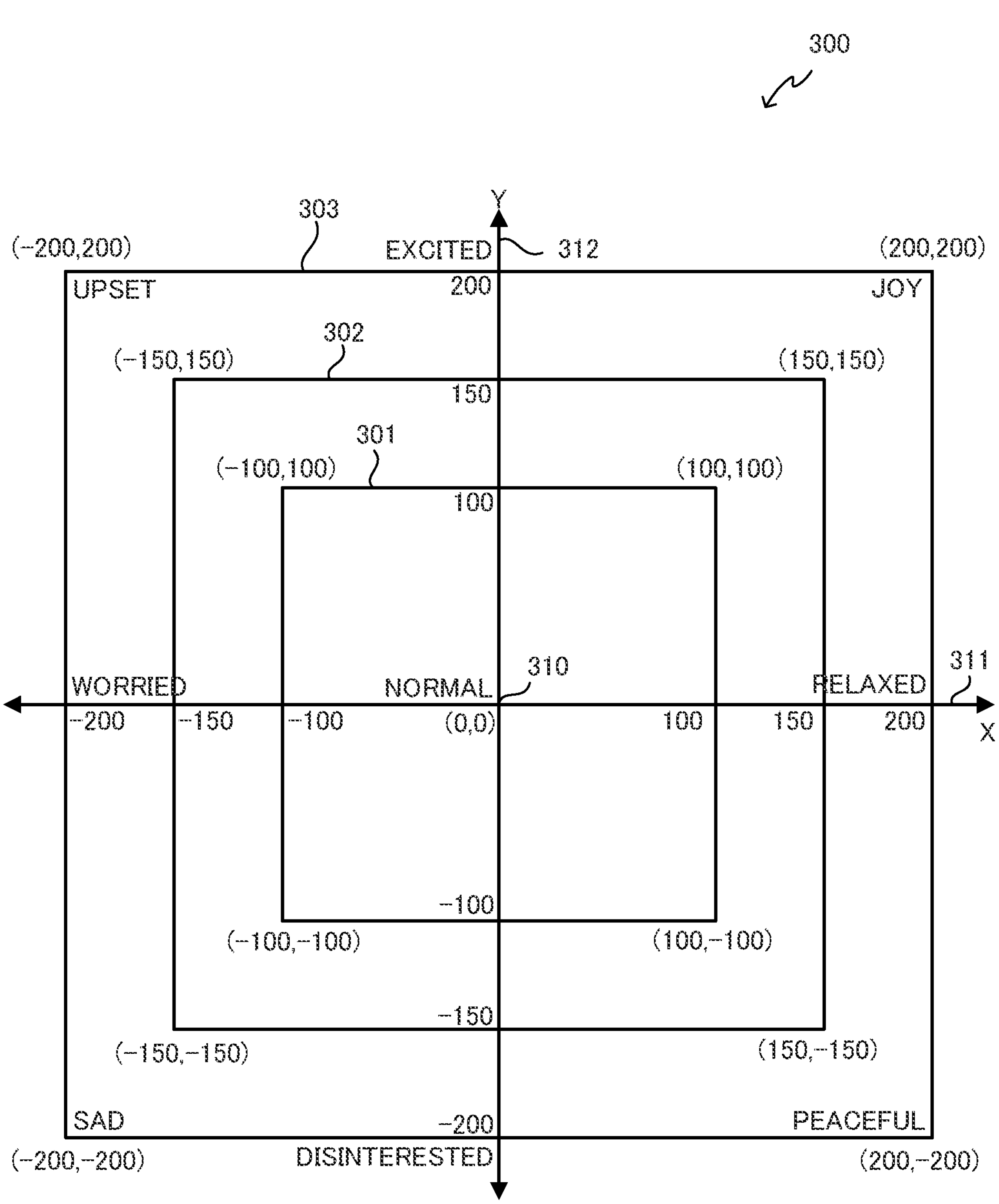
FIG. 6 is a drawing explaining an example of an emotion map according to Embodiment 1.

The emotion data 121 is data for imparting pseudo-emotions to the robot 200, and is data (X, Y) that represents coordinates on an emotion map 300. As illustrated in FIG. 6, the emotion map 300 is expressed by a two-dimensional coordinate system with a degree of relaxation (degree of worry) axis as an X axis 311, and a degree of excitement (degree of disinterest) axis as a Y axis 312. An origin 310 (0, 0) on the emotion map 300 represents an emotion when normal. Moreover, as the value of the X coordinate (X value) is positive and the absolute value thereof increases, emotions for which the degree of relaxation is high are expressed and, as the value of the Y coordinate (Y value) is positive and the absolute value thereof increases, emotions for which the degree of excitement is high are expressed. Additionally, as the X value is negative and the absolute value thereof increases, emotions for which a degree of worry is high are expressed and, as the Y value is negative and the absolute value thereof increases, emotions for which a degree of disinterest is high are expressed. Note that, in FIG. 6, the emotion map 300 is expressed as a two-dimensional coordinate system, but the number of dimensions of the emotion map 300 may be set as desired.

In the present embodiment, regarding the size of the emotion map 300 as the initial value, as illustrated by frame 301 of FIG. 6, a maximum value of both the X value and the Y value is 100 and a minimum value is −100. Moreover, during a first period, each time the pseudo growth days count of the robot 200 increases one day, the maximum value and the minimum value of the emotion map 300 both increase by two. Here, the first period is a period in which the robot 200 grows in a pseudo manner, and is, for example, a period of 50 days from a pseudo birth of the robot 200. Note that the pseudo birth of the robot 200 is the time of the first start up by the user of the robot 200 after shipping from the factory. When the growth days count is 25 days, as illustrated by frame 302 of FIG. 6, the maximum value of the X value and the Y value is 150 and the minimum value is −150. Moreover, when the first period (in this example, 50 days) elapses, the pseudo growth of the robot 200 ends and, as illustrated in frame 303 of FIG. 6, the maximum value of the X value and the Y value is 200, the minimum value is −200, and the size of the emotion map 300 is fixed.

The emotion change data 122 is data that sets an amount of change that each of an X value and a Y value of the emotion data 121 is increased or decreased. In the present embodiment, as emotion change data 122 corresponding to the X of the emotion data 121, DXP that increases the X value and DXM that decreases the X value are provided and, as emotion change data 122 corresponding to the Y value of the emotion data 121, DYP that increases the Y value and DYM that decreases the Y value are provided. Specifically, the emotion change data 122 includes the following four variables, and is data expressing degrees to which the pseudo emotions of the robot 200 are changed.

DXP: Tendency to relax (tendency to change in the positive value direction of the X value on the emotion map)

DXM: Tendency to worry (tendency to change in the negative value direction of the X value on the emotion map)

DYP: Tendency to be excited (tendency to change in the positive value direction of the Y value on the emotion map)

DYM: Tendency to be disinterested (tendency to change in the negative value direction of the Y value on the emotion map)

In the present embodiment, an example is described in which the initial value of each of these variables is set to 10, and the value increases to a maximum of 20 by processing for learning emotion change data 122 in action control processing, described later. Due to this learning processing, the emotion change data 122, that is, the degree of change of emotion changes and, as such, the robot 200 assumes various personalities in accordance with the manner in which the user interacts with the robot 200.

The growth days count data 123 has an initial value of 1, and 1 is added for each passing day. The growth days count data 123 represents a pseudo growth days count (number of days from a pseudo birth) of the robot 200.

As illustrated in FIG. 7, control conditions and control data are associated and stored in the control content table 124. When a control condition is satisfied (for example, some sort of external stimulus is detected), the controller 110 controls the actuator 220 and the sound outputter 230 on the basis of the corresponding control data (motion data for expressing an action by the actuator 220, and sound effect data for outputting a sound effect from the sound outputter 230).

As illustrated in FIG. 7, the motion data is a series of sequence data for controlling the actuator 220 (arranged as "Time (ms): Rotational angle (degree) of vertical motor 222: Rotational angle (degree) of twist motor 221"). For example, when the body is petted, the controller 110 controls the actuator 220 so that, firstly (at 0 sec), the rotational angles of the vertical motor 222 and the twist motor 221 are set to 0 degrees (vertical reference angle and twist reference angle), at 0.5 sec, the head 204 is raised so that the rotational angle of the vertical motor 222 becomes 60 degrees, and at 1 sec, the head 204 is twisted so that the rotational angle of the twist motor 221 becomes 60 degrees.

Regarding the sound effect data, to facilitate ease of understanding, text describing each piece of the sound effect data is included in FIG. 7, but in actuality, the sound effect data (sampled sound data) described by the text itself is stored in the control content table 124 as the sound effect data.

Note that, in the control content table illustrated in FIG. 7, conditions related to emotion (expressed by the coordinates on the emotion map 300) and/or to similarity with a hereinafter described history (a sound history 126 and a touch history 127) is not included in the control conditions, but a configuration is possible in which these conditions are included, and the control data is changed in accordance with the emotion and/or the similarity with the history.

As described above, the sound buffer 125 is a region in which data, obtained by sampling the sound acquired by the microphone 214 at a prescribed sampling frequency and number of quantization bits, is stored. In FIG. 5, the sound buffer 125 includes the reference number (16) of the sound subbuffers 1250, but a configuration is possible in which the sound buffer 125 is constituted by a ring buffer including the reference number of sound subbuffers 1250 or more.

As described above, the sound history 126 is a storage region (VFIFO) in which the history storage number of the history of the sound feature parameter is stored according to a first-in first-out method. The sound history 126 is constituted by a ring buffer that includes the history storage number of elements, and old data is automatically overwritten by new data.

As described above, the touch history 127 is a storage region (TFIFO) in which the history storage number of the history of the touch feature parameter is stored according to a first-in first-out method. The touch history 127 is constituted by a ring buffer that includes the history storage number of elements, and old data is automatically overwritten by new data. Note that a configuration is possible in which the history storage number of the sound history 126 and the history storage number of the touch history 127 are different.

Next, the action control processing executed by the controller 110 of the action control device 100 is described while referencing the flowchart illustrated in FIG. 8. The action control processing is processing in which the controller 110 controls the actions (motion, animal sound, or the like) of the robot 200 on the basis of detection values from the sensor 210 or the like. When the user turns ON the power of the robot 200, execution of a thread of this action control processing is started in parallel with other required processings. As a result of the action control processing, the actuator 220 and the sound outputter 230 are controlled, the motion of the robot 200 is expressed, sound effects such as animal sounds and the like are output, and the like.

Firstly, the controller 110 initialization-processes the various types of data such as the emotion data 121, the emotion change data 122, the growth days count data 123, and the like (step S101). The various variables used in the present embodiment (BigSound_Flag, TalkSound_Flag, Touch_Flag, and the like) are also initialized to OFF or 0 in step S101.

Next, the controller 110 executes microphone input processing for acquiring an external stimulus (sound) of a subject (the user) from the microphone 214 (step S102). A detailed description of the microphone input processing is given later.

Next, the controller 110 executes touch input processing for acquiring an external stimulus (petted, picked up, or the like) from the subject (the user) by the touch sensor 211 and/or the acceleration sensor 212 (step S103). A detailed description of the touch input processing is given later.

Note that, in the present embodiment, to facilitate comprehension, the microphone input processing and the touch input processing are described as separate processings, but a configuration is possible in which external stimuli are acquired from the various types of sensors of the sensor 210 as a single processing (external input processing).

Next, the controller 110 determines whether an external stimulus is acquired by the sensor 210 (step S104). For example, as a result of the microphone input processing described above, BigSound_Flag is set to ON when a loud sound is detected, and TalkSound_Flag is set to ON when the talking voice of a human is detected. Additionally, as a result of the touch input processing described above, Touch_Flag is set to ON when an external stimulus is detected by the various types of sensors (the touch sensor 211, the acceleration sensor 212, and the gyrosensor 213). Thus, the controller 110 can determine, on the basis of the values of these flag variables, whether an external stimulus is acquired in step S104.

When a determination is made that the external stimulus is acquired (step S104; Yes), the controller 110 acquires, in accordance with the external stimulus acquired in the microphone input processing and the touch input processing, the emotion change data 122 to be added to or subtracted from the emotion data 121 (step S105). When, for example, petting of the head 204 is detected as the external stimulus, the robot 200 obtains a pseudo sense of relaxation and, as such, the controller 110 acquires DXP as the emotion change data 122 to be added to the X value of the emotion data 121.

Next, the controller 110 sets the emotion data 121 in accordance with the emotion change data 122 acquired in step S105 (step S106). When, for example, DXP is acquired as the emotion change data 122 in step S105, the controller 110 adds the DXP of the emotion change data 122 to the X value of the emotion data 121. However, in a case in which a value (X value, Y value) of the emotion data 121 exceeds the maximum value of the emotion map 300 when adding the emotion change data 122, that value of the emotion data 121 is set to the maximum value of the emotion map 300. In addition, in a case in which a value of the emotion data 121 is less than the minimum value of the emotion map 300 when subtracting the emotion change data 122, that value of the emotion data 121 is set to the minimum value of the emotion map 300.

In steps S105 and S106, any type of settings are possible for the type of emotion change data 122 acquired and the emotion data 121 set for each individual external stimulus. Examples are described below.

The head 204 is petted (relax): X=X+DXP

The head 204 is struck (worry): X=X-DXM (these external stimuli can be detected by the touch sensor 211H of the head 204)

The torso 206 is petted (excite): Y=Y+DYP

The torso 206 is struck (disinterest): Y=Y−DYM (these external stimuli can be detected by the touch sensor 211 of the torso 206)

Held with head upward (happy): X=X+DXP and Y=Y+DYP

Suspended with head downward (sad): X=X−DXM and Y=Y−DYM

Spoken to in kind voice (peaceful): X=X+DXP and Y=Y−DYM

Yelled at in loud voice (upset): X=X−DXM and Y=Y+DYP (these external stimuli can be detected by the microphone 214)

Then, controller 110 references the control content table 124 and acquires the control data corresponding to the control condition that is satisfied by the external stimulus acquired in step S102 and step S103 (step S107).

Then, the controller 110 starts up a control data playback thread, and plays back the control data acquired in step S107 (step S108). The control data playback thread is a thread for only playing back the control data (controlling the actuator 220 on the basis of the motion data, and outputting sound from the sound outputter 230 on the basis of the sound effect data). However, by executing the control data playback thread in a thread separate from the action control processing, the action control processing can proceed in parallel even when the robot 200 is acting on the basis of the control data.

Then, the controller 110 sets the flag variables (BigSound_Flag, TalkSound_Flag, and Touch_Flag) to OFF (step S109), and executes step S112.

Meanwhile, when a determination is made that the external stimulus is not acquired (step S104; No), the controller 110 determines whether to perform a spontaneous action such as a breathing action that creates the impression that the robot 200 is breathing, or the like, by periodically driving the actuator 220 at a certain rhythm (step S110). Any method may be used as the method for determining whether to perform the spontaneous action and, in the present embodiment, it is assumed that the determination of step S110 is "Yes" and the breathing action is performed every breathing cycle (for example, two seconds).

When a determination is made to perform the spontaneous action (step S110; Yes), the controller 110 executes the spontaneous action (for example, the breathing action) (step S111), and executes step S112.

When a determination is made to not perform the spontaneous action (step S110; No), the controller 110 uses a built-in clock function to determine whether a date has changed (step S112). When a determination is made that the date has not changed (step S112; No), the controller 110 executes step S102.

Meanwhile, when a determination is made that the date has changed (step S112; Yes), the controller 110 determines whether it is in a first period (step S113). When the first period is, for example, a period 50 days from the pseudo birth (for example, the first startup by the user after purchase) of the robot 200, the controller 110 determines that it is in the first period when the growth days count data 123 is 50 or less. When a determination is made that it is not in the first period (step S113; No), the controller 110 executes step S116.

When a determination is made that it is in the first period (step S113; Yes), the controller 110 executes learning processing of the emotion change data 122 (step S114). Specifically, the learning processing of the emotion change data 122 is processing for increasing the corresponding emotion change data 122 when the value of the emotion data 121 reaches the minimum value or the maximum value of the emotion map 300 even once in step S106 of that day. For example, when the X value of the emotion data 121 is set to the maximum value of the emotion map 300 even once, 1 is added to the DXP of the emotion change data 122, when the Y value is set to the maximum value of the emotion map 300 even once, 1 is added to the DYP, when the X value is set to the minimum value of the emotion map 300 even once, 1 is added to the DXM, and when the Y value is set to the minimum value of the emotion map 300 even once, 1 is added to the DYM. However, when the various values of the emotion change data 122 become excessively large, the amount of change at one time of the emotion data 121 becomes excessively large and, as such, the maximum values of the various values of the emotion change data 122 are set to 20, for example, and are set so as not to increase therebeyond.

Then, the controller 110 expands the emotion map (step S115). Expanding the emotion map is, specifically, processing in which the controller 110 expands both the maximum values and the minimum values of emotion map 300 by 2. However, the numerical value "2" to be expanded is merely an example, and the emotion map 300 may be expanded by 3 or greater, or be expanded by 1. Additionally, the numerical values that the emotion map 300 is expanded by need not be the same for the maximum values and the minimum values.

Then, the controller 110 adds 1 to the growth days count data 123 (step S116), initializes both the X value and the Y value of the emotion data 121 to 0 (step S117), and executes step S102.

Next, the microphone input processing executed in step S102 of the action control processing (FIG. 8) is described while referencing FIG. 9.

Firstly, the controller 110 substitutes, for a variable ML, a maximum level of the sampling data stored in the first sound subbuffer 1250 of the sound buffer 125, that is, a maximum level of the sampling data stored in buf[0] (step S201). Next, the controller 110 determines whether the value of the variable ML is greater than a BigSoundTh (step S202).

Note that the BigSoundTh is a value (loud sound threshold), and the robot 200 performs a surprised action in response to sounds louder than the BigSoundTh. When a determination is made that the variable ML is greater than the BigSoundTh (step S202; Yes), the controller 110 sets a variable BigSound_Flag, indicating that a loud sound has been input, to ON (step S203), ends the microphone input processing, and executes step S103 of the action control processing.

Meanwhile, when a determination is made that the variable ML is not greater than the BigSoundTh (step S202; No), the controller 110 determines whether the value of the variable ML is greater than a TalkSoundTh. Note that the TalkSoundTh is a value (talking voice threshold), and the robot 200 cannot hear, as a talking voice, sounds that are quieter than or equal to the TalkSoundTh. When a determination is made that the variable ML is not greater than the TalkSoundTh (step S204; No), the controller 110 ends the microphone input processing, and executes step S103 of the action control processing.

Meanwhile, when a determination is made that the variable ML is greater than the TalkSoundTh (step S204; Yes), the controller 110 temporarily stops the twist motor 221 and the vertical motor 222 of the actuator 220 (step S205). As a result, the actions of the actuator 220, being controlled by the control data playback thread, are temporarily stopped and, as such, noise generated by the actions of the actuator 220 cease to be produced.

Next, the controller 110 determines whether the number of the sound subbuffers 1250 in which the sound data is stored is less than the reference number (here, the 16 sound subbuffers of buf[0] to buf[15]) (step S206). When a determination is made that the number of the sound subbuffers 1250 in which the sound data is stored is less than the reference number (step S206; Yes), the controller 110 executes step S206 and waits until the number of the sound subbuffers 1250 in which the sound data is stored to reach the reference number.

Note that, as a result of the sound buffer storage thread, the sound data is consecutively stored in the sound buffer 125 and, as such, by waiting in the microphone input processing, the number of the sound subbuffers 1250 in which the sound data is stored eventually reaches the reference number (at the latest, after 0.5 seconds, which corresponds to the entire size of the 16 sound subbuffers 1250, which is the reference number).

Meanwhile, when a determination is made that the number of the sound subbuffers 1250 in which the sound data is saved has reached the reference number (step S206; No), the controller 110 restarts the actions of the twist motor 221 and the vertical motor 222 of the actuator 220 (step S207). As a result, the actions of the actuator 220, being controlled by the control data playback thread, are restarted. Thus, the amount of time that the actuator 220 is temporarily stopped is, at longest, 0.5 seconds or less, and the user is not caused to feel that the actions of the robot 200 are unnatural.

Then, the controller 110 executes sound feature parameter calculation processing (step S208). A detailed description of the sound feature parameter calculation processing is given later.

Next, the controller 110 determines whether the sound stored in the reference number of the sound subbuffers 1250 is noise (step S209). Any method can be used to determine whether the sound is noise but, in the present embodiment, the following three noise determination methods (first, second, and third noise determination methods) are used.

In the first noise determination method, firstly, for a predetermined number of buffers (for example, three sound buffers, namely, buf[0], buf[1], and buf[2]) from the beginning (buf[0]) among the reference number of the sound subbuffers 1250, the controller 110 investigates the number of sound subbuffers 1250 in which, of the sound data stored in each buffer, sound data having a maximum value greater than the TalkSoundTh is stored. When there is even one sound subbuffer 1250 in which sound data having a maximum value less than or equal to the TalkSoundTh is stored, the controller 110 determines that the all of the sound data stored in the reference number of sound subbuffers 1250 is noise.

In the second noise determination method, for the reference number of the sound subbuffers 1250, the controller 110 counts how many sound subbuffers 1250, of the reference number of the sound subbuffers 1250, there are in which a peak value of the sound data is greater than or equal to the TalkSoundTh and, when that number of the sound subbuffers 1250 is less than or equal to a predetermined number (for example, five), determines that all of the sound data stored in the reference number of the sound subbuffers 1250 is noise.

In the third noise determination method, the controller 110 firstly collects the sound data of the reference number of the sound subbuffers 1250, and confirms a frequency component for the sound data corresponding to a predetermined amount of time (for example, 0.5 seconds). Note that this frequency component is already calculated in the sound feature parameter calculation processing described above and, as such, it is sufficient that the controller 110 confirms the calculated frequency component. When the frequency component is uniform from a low range to a high range, or when the low range is smaller than the high range, a determination is made that all of the sound data stored in the reference number of the sound subbuffers 1250 is noise.

When, in any of the noise determination methods described above, the controller 110 determines that the sound data stored in the reference number of the sound subbuffers 1250 is noise (step S209; Yes), the controller 110 disregards the sound data stored in the current reference number of the sound subbuffers 1250 (that is, determines that there are no external stimuli of sound), ends the microphone input processing, and executes step S103 of the action control processing.

Meanwhile, when, in any of the noise determination methods described above, the controller 110 determines that the sound stored in the reference number of the sound subbuffers 1250 is not noise (step S209; No), the controller 110 determines that the sampling data is a talking voice, and substitutes ON for the variable TalkSound_Flag that indicates that a talking voice is inputted (step S210).

Next, the controller 110 compares the sound feature parameter, calculated in the sound feature parameter calculation processing, and the sound history 126 to acquire the similarity with the past sound (step S211).

Then, the controller 110 stores the sound feature parameter calculated in step S208 in the sound history 126 (VFIFO) (step S212), ends the microphone input processing, and executes step S103 of the action control processing.

Note that, in FIG. 9, a configuration is possible in which the order of the sound feature parameter calculation processing (step S208) and the noise determination (step S209) are switched, and the sound feature parameter calculation processing is executed only when a determination is made that the sound data is not noise (step S209; No). In such a case, the information about the frequency component calculated in the third noise determination method can also be used in the sound feature parameter calculation processing.

Figure 10:
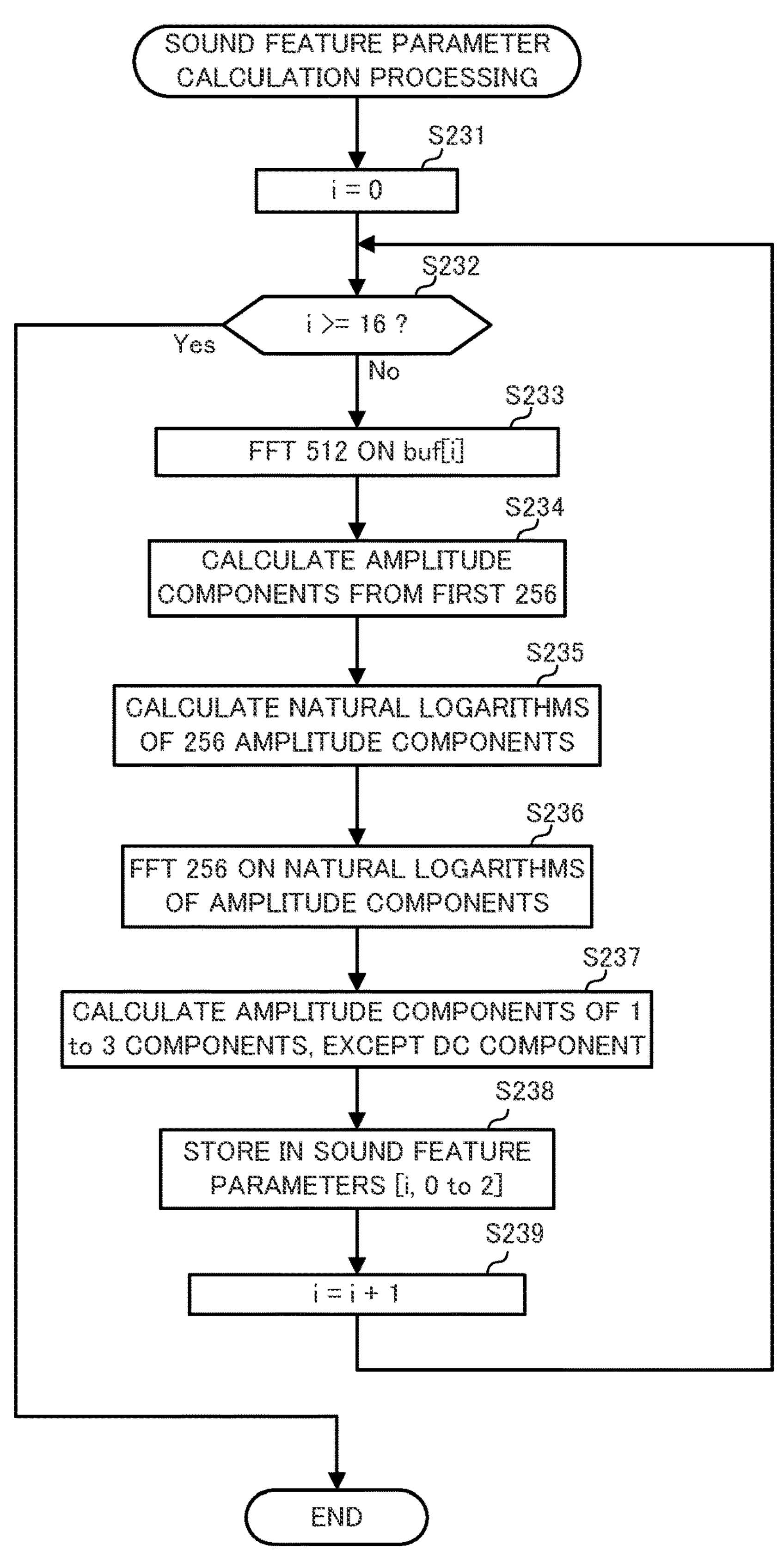
FIG. 10 is a flowchart of sound feature parameter calculation processing according to Embodiment 1.

Next, the sound feature parameter calculation processing executed in step S208 of the microphone input processing (FIG. 9) is described while referencing FIG. 10. Note that, here, an example is described in which the reference number of the sound subbuffers 1250 is 16.

Firstly, the controller 110 initializes a variable i to 0 (step S231). The variable i is for specifying the various elements (buf[0] to buf[15]) of the sound subbuffers 1250 as array variables. Then, the controller 110 determines whether the variable i is greater than or equal to 16 (step S232). When a determination is made that the variable i is greater than or equal to 16 (step S232; Yes), the controller 110 ends the sound feature parameter calculation processing, and executes step S209 of the microphone input processing.

Meanwhile, when a determination is made that the variable i is less than 16 (step S232; No), the controller 110 performs fast Fourier transform (FFT) for the 512 samples included in the buf[i] (step S233). Then, the controller 110 calculates the first 256 amplitude components (a frequency spectrum of the sound data) obtained from the FFT (step S234). Here, when the amplitude components are stored in variables $\alpha[0]$ to $\alpha[255]$, the controller 110 calculates:

$$\alpha[n]=\sqrt{(\text{square of } n\text{th real component}+\text{square of } n\text{th imaginary component})}$$

(where n is from 0 to 255).

Next, the controller 110 calculates a natural logarithm of each of the 256 amplitude components (step S235). Here, when the natural logarithms are stored in variables $\beta[0]$ to $\beta[255]$, the controller 110 calculates:

$$\beta[n]=ln(\alpha[n])$$

(where n is from 0 to 255).

Next, the controller 110 again performs FFT on the calculated 256 natural logarithms (step S236). Then, the controller 110 calculates, among the components obtained from the FFT, the amplitude components of a reference number (in the present embodiment, three) of components from the beginning, except for the DC component (the first one) (step S237). Here, cepstrums are obtained and, as such, when the cepstrums are stored in variables Cps[0] to Cps[2], the controller 110 calculates:

$$Cps[n-1]=\sqrt{(\text{square of } n\text{th real component}+\text{square of } n\text{th imaginary component})}$$

(where n is from 1 to 3).

Next, the controller 110 stores the calculated three cepstrums as sound feature parameters (step S238). Here, when the sound feature parameters are stored in array variables VF[i, n]], the controller 110 executes:

$$VF[i,n]=Cps[n] \text{ (where } n \text{ is from 0 to 2).}$$

Then, the controller 110 adds 1 to the variable i (step S239), and executes step S232.

As a result of the sound feature parameter calculation processing described above, a sound feature parameter (VF [0, 0] to VF[15, 2]) having 16×3=48 elements is obtained. As described above, this sound feature parameter is constituted by the cepstrums of three components from the low frequency, except for the DC component. and, as such, is a feature quantity with a high capability of identifying differences between people, regardless of being calculatable from a short amount of time (0.5 seconds) of sound data.

Figure 11:
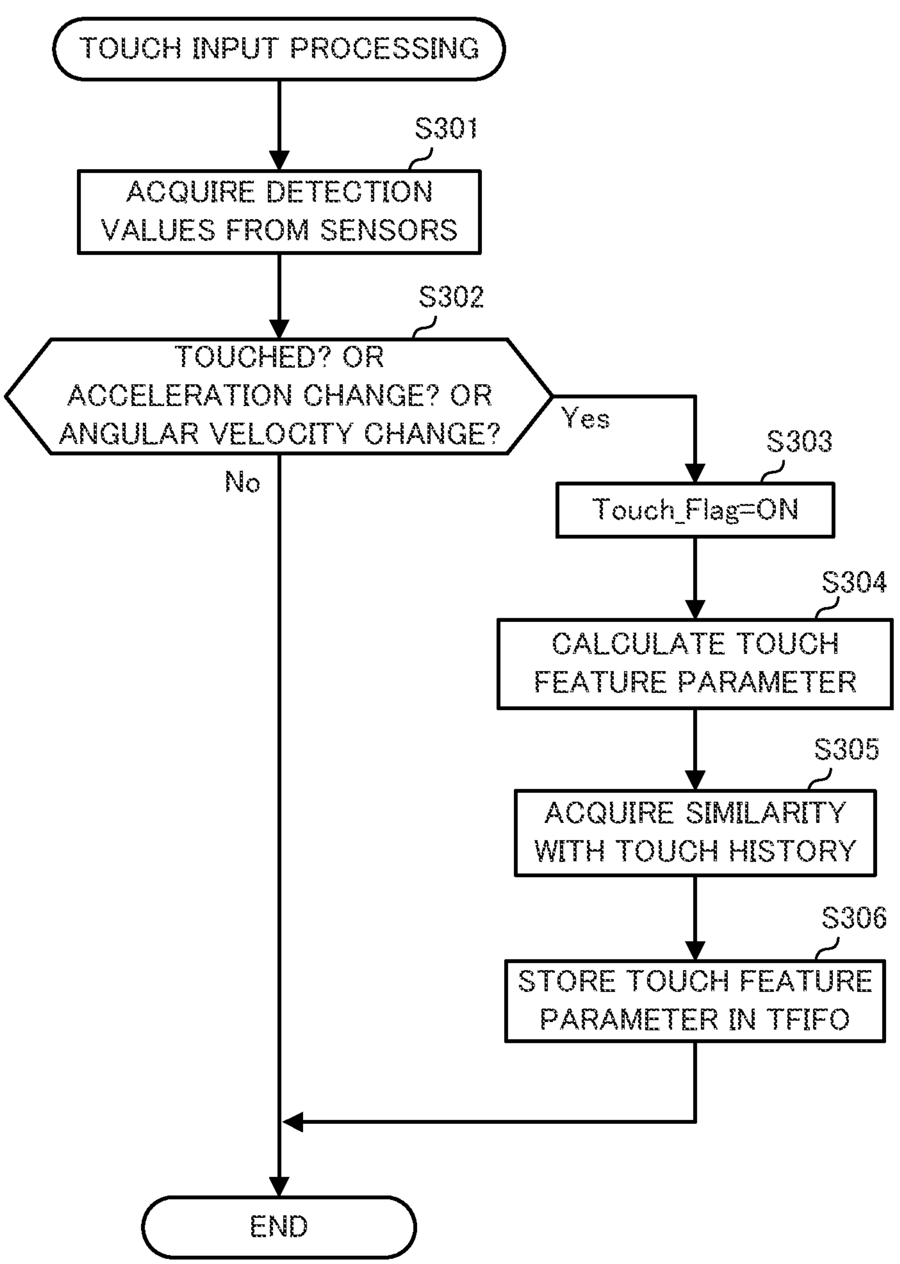
FIG. 11 is a flowchart of touch input processing according to Embodiment 1.

Next, the touch input processing executed in step S103 of the action control processing (FIG. 8) is described while referencing FIG. 11.

Firstly, the controller 110 acquires, from the touch sensor 211, the acceleration sensor 212, and the gyrosensor 213, the detection values detected by each of these sensors (step S301). Then, the controller 110 determines, on the basis of the detection values, if a touch is detected by the touch sensor 211, if the acceleration detected by the acceleration sensor 212 has changed, or if the angular velocity detected by the gyrosensor 213 has changed (step S302).

When there is a touch, an acceleration change, or an angular velocity change (step S302; Yes), the controller 110 sets the variable Touch_Flag to ON (step S303), and calculates the touch feature parameter (step S304). As described above, the touch feature parameter includes five-dimensional information of the attitude of the robot 200 (dir), the touch strength of the head (touch_Head), the touch strength of the left side surface (touch_Left), the touch strength of the right side surface (touch_Right), and the vibration strength (gyro_Level).

Then, the controller 110 compares the touch feature parameter calculated in step S304 with the touch history 127 to acquire the similarity with the past sensor information (step S30S).

Then, the controller 110 stores, in a first-in first-out method and in the touch history 127 (TFIFO), the touch feature parameter calculated in step S304 (step S306). Then, the controller 110 ends the touch input processing, and executes step S104 of the action control processing.

As a result of the action control processing described above, the controller 110 acquires the external stimulus acting on the robot 200 (the device to be controlled), and performs an action corresponding to the external stimulus. Moreover, as a result of the microphone input processing, when the controller 110 determines that a talking voice is acquired by the microphone 214, the effects of noise are reduced by temporarily stopping the actions of the actuator 220.

Since the robot 200 is covered by the exterior 201 (fur), the exterior 201 moves when the head 204 is moved by the actuator 220. Accordingly, while the actuator 220 is performing an action, the microphone 214 is more likely to pick up not only the motor sound (caused by the action of the actuator 220), but also the sound of the exterior 201 rubbing. In the present embodiment, the controller 110 temporarily stops the action of the actuator 220 when starting to acquire the talking voice of a person and, as such, the generation of not only the motor sound but also of the sound of the exterior 201 rubbing can be prevented, and the potential of erroneously recognizing the sound can be reduced.

Additionally, in the present embodiment, the sound feature parameter can be calculated from sound data having a length of 0.5 seconds and, as such, the predetermined period in which the actuator 220 is temporarily stopped can be kept to 0.5 seconds or less. Accordingly, the mutual effects caused by competition between the sound acquisition processing and the action processing of the actuator can be reduced, and the actions of the robot 200 can be prevented from appearing unnatural.

Modified Examples

The present disclosure is not limited to the embodiments described above, and various modifications and uses are possible.

For example, in the embodiment described above, in step S209 of the microphone input processing (FIG. 9), when a determination is made that the sound data is not noise, a determination is made that the sound acquired by the microphone 214 (the sound data stored in the sound buffer 125) is a human voice. However, the standard for determining that the sound is a human voice is not limited thereto. A configuration is possible in which the controller 110 determines that the sound acquired by the microphone 214 is a human voice when (in step S204 of the microphone input processing (FIG. 9)) the maximum level of the sound subbuffer is greater than a talking voice threshold. Additionally, a configuration is possible in which the controller 110 determines whether the sound acquired by the microphone 214 is a human voice on the basis of the calculated (in step S208 of the microphone input processing (FIG. 9)) value of the sound feature parameter.

A configuration is possible in which, when the similarity with the sound history 126 acquired in the microphone input processing is greater than or equal to a predetermined value, the controller 110 determines that intimacy with the user that emitted the sound is high (the user is the owner or person that always cares for the robot 200), and controls the actuator 220 so as to perform a special action indicating intimacy, causes the sound outputter 230 to output a special animal sound indicating intimacy, or the like. Likewise, a configuration is possible in which, when the similarity with the touch history 127 acquired in the touch input processing is greater than or equal to a predetermined value, the controller 110 determines that the intimacy with the user that petted or hugged the robot 200 is high, and performs a special action or emits a special animal sound indicating intimacy, or the like (for example, see Japanese Patent Application No. 2021-158663, Japanese Patent Application No. 2022-187973, and the like).

A configuration is possible in which the controller 110 registers, as a registered sound parameter in the storage 120, a sound feature parameter calculated from a sound emitted by a specific user and, in the microphone input processing, compares the sound feature parameter with the registered sound parameter to enable recognition of whether the user that emitted the sound is the special user (for example, see Japanese Patent Application No. 2021-158663).

In the embodiment described above, when a determination is made that the sound acquired by the microphone 214 is a human voice, the controller 110 always temporarily stops the actuator 220, but a configuration is possible in which whether to temporarily stop the actuator 220 is determined on the basis of a predetermined condition. For example, a configuration is possible in which, when the Y value of the emotion data 121 is positive and exceeds a predetermined threshold (when the robot 200 is excited), the controller 110 does not temporarily stop the actuator 220 even when a determination is made that the sound acquired by the microphone 214 is a human voice. By controlling in this manner, when the robot 200 is excited, the robot 200 can imitate being in a state in which the robot 200 cannot calmly listen to a human voice (since the motor continues to operate, there is an increased possibility of erroneous recognition of the sound).

In the embodiment described above, the action control device 100 for controlling the robot 200 is built into the robot 200, but the action control device 100 for controlling the robot 200 need not necessarily be built into the robot 200. For example, a configuration is possible in which the action control device 100 is configured as a device separate from the robot 200, and the robot 200 includes a controller 250 and a communicator 260 separate from the controller 110 and the communicator 130 of the action control device 100. In such a case, the communicator 260 and the communicator 130 are configured so as to send and receive data to and from each other, and the controller 110 acquires the external stimulus detected by the sensor 210, controls the actuator 220 and the sound outputter 230, and the like via the communicator 130 and the communicator 260.

In the embodiments described above, a description is given in which the action programs executed by the CPU of the controller 110 are stored in advance in the ROM or the like of the storage 120. However, the present disclosure is not limited thereto, and a configuration is possible in which the action programs for executing the various processings described above are installed on an existing general-purpose computer or the like, thereby causing that computer to function as a device corresponding to the action control device 100 according to the embodiments described above.

Any method can be used to provide such programs. For example, the programs may be stored and distributed on a non-transitory computer-readable recording medium (flexible disc, Compact Disc (CD)-ROM, Digital Versatile Disc (DVD)-ROM, Magneto Optical (MO) disc, memory card, USB memory, or the like), or may be provided by storing the programs in a storage on a network such as the internet, and causing these programs to be downloaded.

Additionally, in cases in which the processings described above are realized by being divided between an operating system (OS) and an application/program, or are realized by cooperation between an OS and an application/program, it is possible to store only the portion of the application/program on the non-transitory recording medium or in the storage. Additionally, the programs can be piggybacked on carrier waves and distributed via a network. For example, the programs may be posted to a bulletin board system (BBS) on a network, and distributed via the network. Moreover, a configuration is possible in which the processings described above are executed by starting these programs and, under the control of the operating system (OS), executing the programs in the same manner as other applications/programs.

Additionally, a configuration is possible in which the controller 110 is constituted by a desired processor unit such as a single processor, a multiprocessor, a multi-core processor, or the like, or by combining these desired processors with processing circuitry such as an application specific integrated circuit (ASIC), a field-programmable gate array (FPGA), or the like.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. An action control device comprising:

a sound acquirer;

an actuator; and a controller configured to:

in response to a determination, during an action of the actuator, that a sound acquired by the sound acquirer is a human voice, control so as to (i) stop the actuator, (ii) capture sound after the determination for a predetermined period of time, and (iii) in response to the predetermined period of time having elapsed, restart the action of the actuator, wherein the restart of the action of the actuator is performed regardless of a further determination during the predetermined period of time that the sound acquired by the sound acquirer is the human voice.

2. The action control device according to claim 1, further comprising:

a storage including a plurality of storage regions, wherein the controller is configured to:

in response to sound data corresponding to the sound acquired by the sound acquirer being stored in a portion of the plurality of storage regions, determine, using the stored sound data, whether the sound is the human voice, and in response to a determination being made that the sound is the human voice, control so as to stop the actuator, and sequentially store, in the plurality of storage regions, the sound data corresponding to a continuously acquired sound acquired in the predetermined period of time.

3. The action control device according to claim 2, wherein the controller is configured to recognize, by analyzing the sound data sequentially stored in the plurality of storage regions, a target having emitted the sound.

4. The action control device according to claim 2, wherein the controller is configured to:

capture a cepstrum of the sound data sequentially stored in the plurality of storage regions, and recognize, based on a similarity with the calculated cepstrum, a target having emitted the sound.

5. The action control device according to claim 1, further comprising:

a housing; and a part for which a positional relationship with the housing changes due to the action of the actuator, wherein:

the sound acquirer is provided at a position, on a surface of the housing, suitable for acquiring an external environmental sound, and the actuator is provided inside the housing.

6. The action control device according to claim 1, further comprising:

a microphone having directionality such that it is less likely for the sound acquirer to acquire sound from the actuator.

7. The action control device according to claim 1, wherein the predetermined period of time corresponds to a data amount of sample data required for the controller to analyze the sound data acquired from the sound acquirer and determine that the acquired sound is the human voice.

8. An action control method of an action control device comprising a sound acquirer, an actuator, and a controller, the method being performed by the controller, and the method comprising:

in response to a determination, during an action of the actuator, that a sound acquired by the sound acquirer is a human voice, controlling so as to (i) stop the actuator, (ii) capture sound after the determination for a predetermined period of time, and (iii) in response to the predetermined period of time having elapsed, restart the action of the actuator, wherein the restart of the action of the actuator is performed regardless of a further determination during the predetermined period of time that the sound acquired by the sound acquirer is the human voice.

9. A non-transitory computer-readable recording medium storing a program thereon for controlling an action control device comprising a sound acquirer, an actuator, and a controller, the program being executable by the controller to cause the controller to execute processing comprising:

in response to a determination being made during an action of actuator that a sound acquired by the sound acquirer is a human voice, controlling so as to (i) stop the actuator, (ii) capture sound after the determination for a predetermined period of time, and (iii) in response to the predetermined period of time having elapsed, restart the action of the actuator, wherein the restart of the action of the actuator is performed regardless of a further determination during the predetermined period of time that the sound acquired by the sound acquirer is the human voice.

* * * * *